United States Patent
Johnson et al.

(10) Patent No.: US 10,273,793 B2
(45) Date of Patent: Apr. 30, 2019

(54) MANAGEMENT AND CONTROL OF A SEALING ELEMENT OF A ROTATING CONTROL DEVICE

(71) Applicant: SCHLUMBERGER TECHNOLOGY CORPORATION, Sugar Land, TX (US)

(72) Inventors: Ashley Bernard Johnson, Cambridge (GB); Paul Anthony Francis, London (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 606 days.

(21) Appl. No.: 14/676,845

(22) Filed: Apr. 2, 2015

(65) Prior Publication Data

US 2015/0285054 A1 Oct. 8, 2015

(30) Foreign Application Priority Data

Apr. 2, 2014 (GB) .................................. 1405968.7

(51) Int. Cl.
 *E21B 44/00* (2006.01)
 *G01M 13/00* (2006.01)
 (Continued)

(52) U.S. Cl.
 CPC .......... *E21B 44/00* (2013.01); *E21B 47/0006* (2013.01); *G01M 13/005* (2013.01)

(58) Field of Classification Search
 CPC ...... G01M 13/005; E21B 44/00; E21B 33/06; E21B 33/085; E21B 47/0006
 (Continued)

(56) References Cited

U.S. PATENT DOCUMENTS 2,846,013 A    8/1958   Davis
4,392,792 A    7/1983   Rogers
(Continued)

FOREIGN PATENT DOCUMENTS

EP         0288979 A2    11/1988
WO    2011019888 A1    2/2011
(Continued)

OTHER PUBLICATIONS

Examination Report for corresponding GB Application Serial No. GB1405968.7, dated Jun. 29, 2018, 4 pages.
(Continued)

*Primary Examiner* — Daniel S Larkin
*Assistant Examiner* — Anthony W Megna Fuentes

(57) ABSTRACT

Managing operation of a sealing element is described. In some aspects, failure of the sealing element of a pressure drilling system may be predicted. Deformation of the sealing element as a tool joint is pulled through the sealing element may be detected and tracked to determine if a deformation pattern of sealing element changes. Responses of sealing element due to one or more of stress, strain, temperature, mechanical load, and pressure using a network of sensors around sealing element can be detected. Responses may be tracked over time. Detected responses are compared to tracked responses to identify changes in the symmetry of responses over time or changes in magnitude of responses over time. Changes are associated with fractures occurring within sealing element. A remaining life of sealing element is predicted based on the changes and replacement may be scheduled based at least in part on the predicted remaining life.

9 Claims, 6 Drawing Sheets

(51) Int. Cl.
*G01M 13/005* (2019.01)
*E21B 47/00* (2012.01)

(58) Field of Classification Search
USPC .......................................... 73/152.01–152.62
See application file for complete search history.

(56) References Cited

U.S. PATENT DOCUMENTS

| | | | |
|---|---|---|---|
| 4,747,454 A | 5/1988 | Perryman | |
| 5,345,829 A | 9/1994 | Yamauchi et al. | |
| 5,448,924 A | 9/1995 | Nagai et al. | |
| 6,865,934 B2 * | 3/2005 | Schultz | E21B 33/12 |
| | | | 73/152.36 |
| 8,844,652 B2 * | 9/2014 | Sokol | E21B 21/106 |
| | | | 175/214 |
| 2003/0226248 A1 | 12/2003 | McGuffin et al. | |
| 2006/0037744 A1 | 2/2006 | Hughes et al. | |
| 2007/0114039 A1 | 5/2007 | Hobdy et al. | |
| 2009/0315267 A1 * | 12/2009 | Castleman | F16J 15/064 |
| | | | 277/312 |

FOREIGN PATENT DOCUMENTS

| | | | | |
|---|---|---|---|---|
| WO | 2011084159 A1 | 7/2011 | | |
| WO | WO 2015060836 A1 * | 4/2015 | ........... | E21B 33/085 |

OTHER PUBLICATIONS

Combined Search and Examination Report for related application No. 1405968.7, dated Oct. 8, 2014, 8 pages.
Examination Report for corresponding GB Application Serial No. 1405969.5, dated Sep. 26, 2016, 3 pages.
Examination Report for related application No. 1405968.7, dated Jun. 26, 2017, 5 pages.

\* cited by examiner

MANAGEMENT AND CONTROL OF A SEALING ELEMENT OF A ROTATING CONTROL DEVICE

CROSS REFERENCE TO RELATED APPLICATION(S)

This application claims priority to Great Britain Patent Application No. 1405968.7, filed Apr. 2, 2014. The disclosure of priority application is hereby incorporated by reference herein in its entirety.

BACKGROUND

Managed pressurized drilling operations utilize oil rigs having a pressurized drilling annulus. A rotating control device (RCD) is mounted atop the annulus and includes a sealing element to seal the annulus, aiding in the creation of the pressurized drilling environment. Conventional management of and condition detection for sealing elements in managed pressure drilling operation equipment is based on pressure measurement above and below the sealing element. In some cases, two sealing elements may be used to seal the annulus. Conventional monitoring of such systems involves measuring the pressure between the two sealing elements. Such pressure monitoring techniques are capable of detecting performance degradation associated with abrasive wear. However, catastrophic failure in managed pressurized drilling systems is often caused by sealing element fatigue and fracture, which are not detectable solely through these pressure measurements. As such, conventional condition detection does little to indicate impending failure of a sealing element. Additionally, conventional condition detection is hindered due to small leaks caused by dynamic movement of the pipe that can make it difficult for pressure measurements to serve as sole indicators of sealing element condition.

Moreover, lab tests of RCDs are made in purpose-built test rigs where tool joints are forced through RCD sealing elements. The failures seen in field installations stem from radial splitting and are different than the failures seen in lab test facilities, which involve symmetrical bulge type failure. There are also significant differences between the test and field geometries of the managed pressure drilling equipment. For example, in the test facilities, the pipe or shaft and sealing element are aligned to one another. However, in the field, the RCD and a blowout preventer (BOP) are aligned to the well head while the drill shaft is aligned to the rig, oftentimes causing misalignment. In conventional applications, any misalignment is taken up by the sealing element of the RCD. As a result, during rotation of the RCD, the sealing element can be subject to high cyclic loading and fatigue failure. Improvements in management, handling of alignment and sealing element condition monitoring are desired.

BRIEF SUMMARY

Embodiments of the present invention serve to provide methods and systems to improve tolerance of misalignment between the shaft aligned with the managed pressure drilling operation equipment of an oil rig and the RCD and BOP aligned with the well head. Embodiments of the invention further provide methods and systems for detecting the condition of RCD sealing elements such that a failure of the sealing element can be predicted. Embodiments of the present invention are generally related to managed pressure drilling equipment of oil rigs (hereinafter pressure drilling system).

In pressure drilling systems, the RCD and BOP are aligned to a well head, but the drill pipe or shaft is aligned to the rig. Due to aligning the RCD, BOP, and shaft with different components, misalignment between the RCD and shaft can result. In conventional applications, any misalignment is taken up by the sealing element of the RCD.

Misalignment between the pressure drilling system equipment and a wellhead can result in the drill shaft being eccentric in the RCD. The eccentricity can produce side forces and lateral deformation in the rubber element, resulting in accelerated fatigue and early failure. Such failures can be very costly in terms of time to make an unscheduled replacement of the rubber sealing element. Additionally, the failure may cause other components to be damaged, thereby adding time to the replacement as well as the cost of replacement components.

In some embodiments of the present invention, alignment pieces/devices may be used to ensure that axes of the RCD, shaft, and the BOP are aligned within a desired tolerance. This axial alignment may ensure that any eccentricity in rotation of the RCD sealing element is minimized, which may in turn reduce fatigue and failure/rate of failure the sealing element. Some embodiments of the present disclosure may further provide sensors that may detect physical characteristics of the sealing element and drill equipment to monitor a condition/performance of the sealing element. This allows, in some aspects, a remaining life of the sealing element to be predicted so that sealing element replacement may be scheduled prior to a catastrophic failure of the component, saving time and money.

In one aspect, embodiments of the invention provide a method for predicting a failure of a sealing element of a pressure drilling system. The method may include detecting and tracking deformation associated with a tool joint of a shaft as the tool joint is pulled through a sealing element to determine if a deformation pattern of the sealing element changes. Responses of the sealing element due to one or more of stress, strain, temperature, mechanical load, and pressure using a network of sensors around the sealing element may be detected. In some aspects, the method may include tracking the responses over time. The detected responses may be compared to the tracked responses to identify changes in the symmetry of the responses over time or changes in magnitude of the responses over time. The changes may be associated with fractures occurring within the sealing element. The method can include predicting a remaining life of the sealing element based on the changes. A sealing element replacement may be scheduled based at least in part on the predicted remaining life.

In some embodiments, detecting responses can include detecting a deformation of the sealing element and identifying any change in the symmetry or magnitude of the deformation that indicates impending failure of the sealing element. The method can further include detecting variations in a rotary speed of the shaft to identify changes in lateral stiffness of the sealing element. In some embodiments, the sealing element can include a conductive material. The method can also include sensing an electrical resistance of the sealing element and detecting changes in the electrical resistance indicative of damage to the sealing element.

In another aspect, embodiments of the present invention provide a method of predicting a failure of a sealing element of a pressure drilling system. The method may include detecting a response of a sealing element of a rotation control device during operation of said device in an oil exploration procedure. The method may also include comparing the detected response to data of previously detected responses to identify structural changes in the sealing element by determining a deviation of the detected response from a typical response of the data of previously detected responses. The changes may be associated with fractures occurring within the sealing element. In some aspects, a remaining life of the sealing element may be predicted/processed based on/using the structural changes.

In some embodiments, detecting the response of the sealing element includes detecting deformation of the sealing element associated with a tool joint being pulled through the sealing element and detecting changes in magnitude or symmetry of the deformation indicative of damage to the sealing element. In another embodiment, the sealing element may include a conductive material. In such an embodiment, the method may include detecting changes in an electrical resistance of the sealing element to determine if the sealing element has been damaged. In some aspects, a determination may be made regarding a sealing element replacement time based at least in part on the predicted remaining life of the element.

In some embodiments, detecting responses includes measuring deformation of the sealing element and comparing the measured deformation to historical data to identify changes in the symmetry or magnitude of the deformation that indicates impending failure of the sealing element. In another embodiment, detecting responses may include comparing sensed responses of a network of sensors positioned in proximity to the sealing element. The sensors can include one or more of strain gauges, stress sensors, temperature sensors, load cells, deformation sensors, pressure sensors and/or the like. In some embodiments, the structural changes are identified by one or more of changes in the symmetry of the responses and changes in magnitude of the responses. The method can also include detecting variations in a rotary speed of the shaft to identify changes in lateral stiffness of the sealing element.

In one aspect, a system for predicting a failure of a sealing element of a pressure drilling system is provided. The system may include a blowout preventer and a rotating control device coupled with the blowout preventer. The system may include a sealing element configured to seal against a shaft disposed within the rotating control device. The system can include one or more sensors coupled with one or more of the sealing element, the blowout preventer, the shaft, the rotating control device. The sensors can be configured to detect signals indicating impending failure of the sealing element such that a sealing element replacement procedure can be scheduled based at least in part on a predicted remaining life of the sealing element.

In some embodiments, the sealing element comprises a conductive material and the one or more sensors include an electrode that monitors an electrical resistance of the sealing element to determine damage to the sealing element. The conductive material can include carbon black or the like. In one embodiment, the sensors are configured to detect deformation associated with a tool joint of the shaft as the tool joint is pulled through the sealing element such that changes to a deformation pattern of the sealing element are determinable. The sensors can be configured to detect deformation of the sealing element such that any change in the symmetry or magnitude of the deformation that indicates failure of the sealing element is identifiable. In some embodiments, the sensors can include one or more of strain gauges, stress sensors, temperature sensors, load cells, deformation sensors, and pressure sensors. The system can also include a rotary encoder configured to detect changes in a rotary speed of the shaft such that changes in lateral stiffness of the sealing element are identifiable.

In one aspect, the present invention provides a method for predicting a failure of a sealing element of a pressure drilling system. The method includes detecting a rotational response of a shaft of the pressure drilling system as the shaft rotates relative to a blowout preventer. The shaft is coupled with a rotating control device that facilitates in rotation of the shaft relative to the blowout preventer. The method also includes tracking previous detected rotational responses over time and comparing the detected response to the tracked responses to identify an eccentricity of the shaft over time that signals a potential fracture occurring within a sealing element positioned between the shaft and the rotating control device. The method further includes predicting a remaining life of the sealing element based on the identified eccentricity and scheduling a sealing element replacement based at least in part on the predicted remaining life.

In some embodiments, the method additionally includes detecting variations in a rotary speed of the shaft to identify changes in lateral stiffness of the sealing element. In some embodiments, the method additionally includes detecting responses of the sealing element due to one or more of stress, strain, temperature, mechanical load, and pressure using a network of sensors in or around the sealing element.

In some embodiments, detecting the rotational response includes detecting a deformation of the sealing element and identifying any change in the symmetry or magnitude of the deformation indicative of an impending failure of the sealing element. In some embodiments, the sealing element includes a conductive material and detecting the rotational response includes sensing an electrical resistance of the sealing element and detecting changes in the electrical resistance indicative of damage to the sealing element.

The above described and many other features and attendant advantages of embodiments of the present invention will become apparent and further understood by reference to the following detailed description when considered in conjunction with the accompanying drawings.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1A:
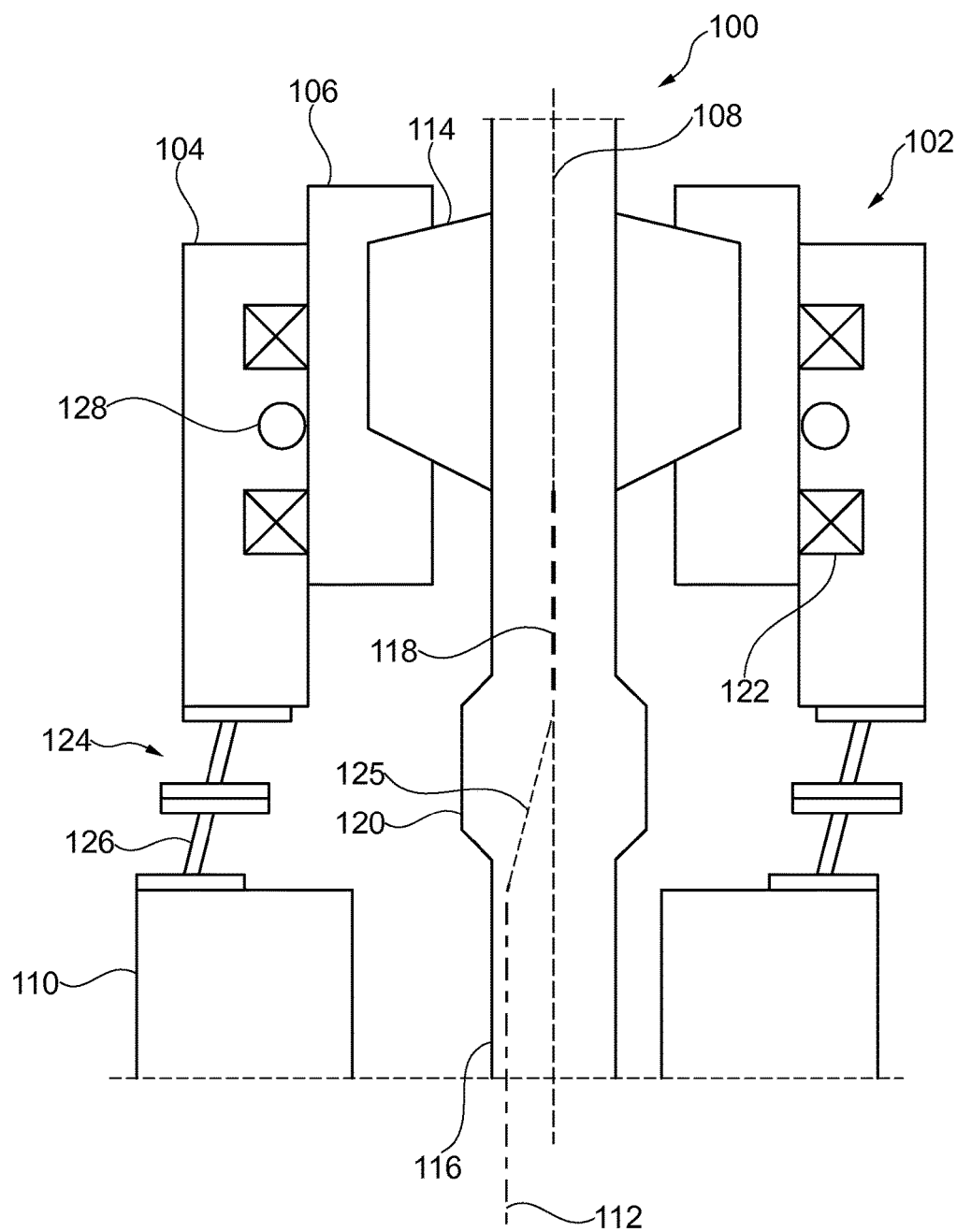
FIG. 1A shows adjustment components oriented to provide maximum offset to account for misalignment of BOP and shaft according to embodiments of the invention.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Some embodiments of the present disclosure provide alignment pieces/devices/systems to ensure that axes of the rotating control device, drill shaft, and the blowout preventer are aligned within a desired tolerance. Such alignment techniques can be utilized in any systems where eccentricity of rotating parts is not desirable. Some embodiments of the present disclosure provide sensors that may be used to detect physical characteristics of the sealing element and drill equipment to monitor a condition of the sealing element. This allows, in accordance with an embodiment of the present invention, a remaining life of the sealing element to be predicted so that a sealing element replacement can be scheduled prior to a catastrophic failure of the component that could lead to increased downtime of the drilling operation and added costs.

A Rotating Control Device is a device used to seal the top of a drilling annulus in a pressure drilling system such that the interior of the drilling annulus can remain pressurized. On a land rig, the RCD is typically mounted on the BOP and the well head. Above the RCD, the drill pipe or shaft is located in the top drive, the derrick, and the oil rig. Any misalignment of the rig with the well head will result in the drill pipe being eccentric in the RCD. This generates side forces and lateral deformation in the sealing element, resulting in accelerated fatigue and early failure. RCDs can include a large flexible annular element (i.e., the sealing element) that seals on the drill pipe and is mounted in a seal assembly to allow rotation and to seal the borehole during drilling so that pressure of the system can be managed. The flexible element is sufficiently flexible to allow tool joints on the drill pipe to be pulled through the device. Catastrophic failure often occurs as a result of one or more radial fractures in the flexible element.

A BOP is a large valve at the top of an oil well that may be closed to control formation fluids. By opening and closing the BOP, pressure control of the formation can be maintained. BOPs come in a variety of styles, sizes and pressure ratings. Some BOPs can effectively close over an open wellbore, while others can seal around tubular components in the well or can be fitted with hardened steel shearing surfaces that can cut through drill pipe. BOPs are critically important to the safety of the crew, the oil rig and the wellbore itself.

Alignment and Offset Correction

Figure 1B:
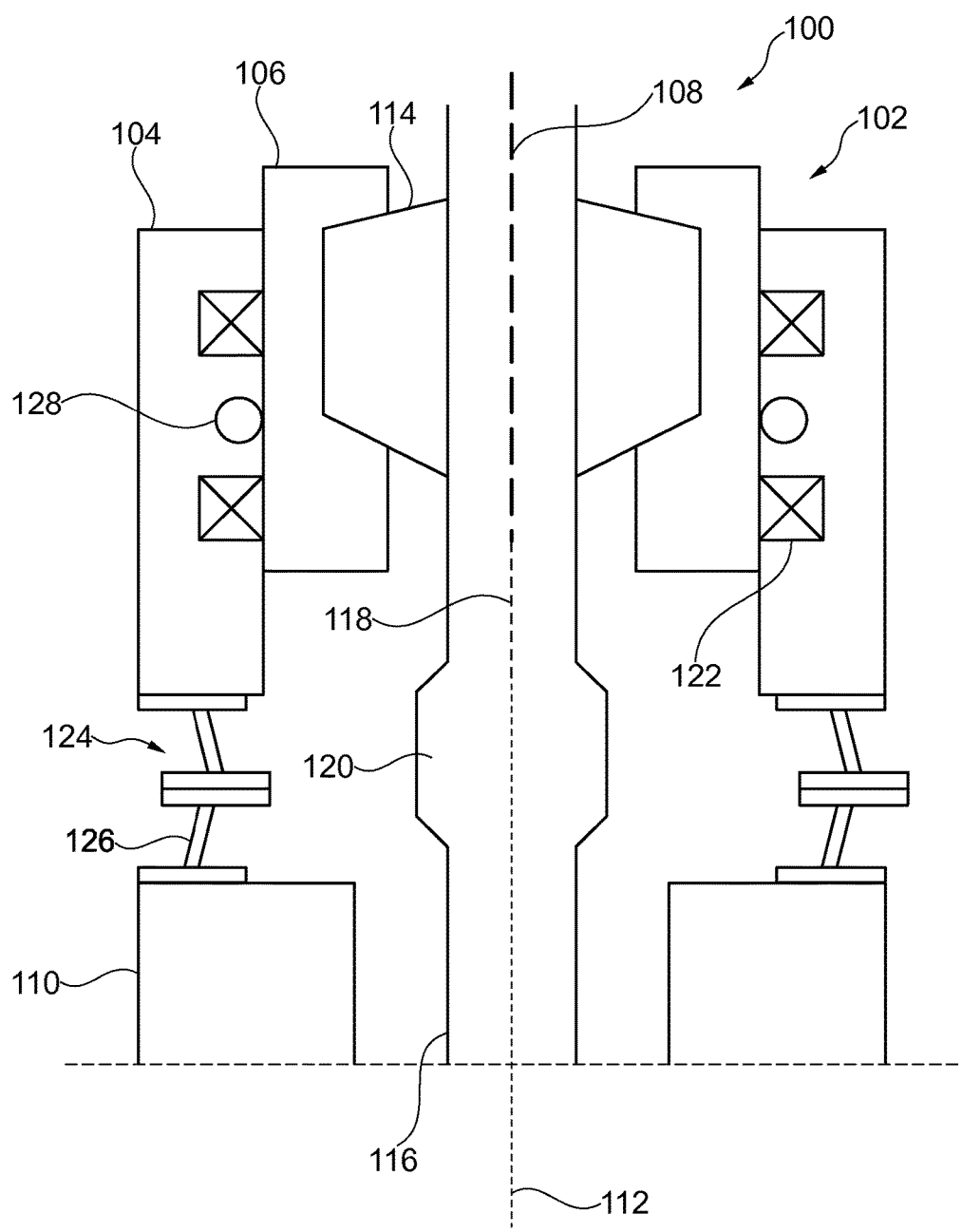
FIG. 1B shows adjustment components oriented to provide minimum offset to account for misalignment of BOP and shaft according to embodiments of the invention.

FIGS. 1A and 1B show drill systems 100 utilizing alignment components to account for misalignment of a shaft, RCD, and BOP. In FIG. 1A, RCD 102 is shown coupled atop BOP 110. BOP 110 can be coupled with a top end of a well head (not shown) and can include a longitudinal axis 112. RCD 102 includes a support section 104, a rotating section 106 and a sealing element 114. Typically, support section 104 is coupled with BOP 110, such as by bolting or other mechanical fastening. Rotating section 106 is often disposed inside of support section 104 and can define an interior of a drilling annulus or chamber. Rotating section 106 can rotate relative to support section 104 via bearings 122. Rotating section 106 can be configured to receive sealing element 114 within the interior of rotating section 106.

Sealing element 114 can be positioned in the interior of rotating section 106 and can seal a top of the drilling annulus against a drill pipe or other shaft 116 of the pressure drilling system. The sealing element 114 allows rotation of the shaft 116 and seals the well head during drilling so that pressure of the system can be managed. Shaft 116 can include a shaft axis 118 that extends longitudinally through a center of shaft 116. Shaft 116 is typically inserted within BOP 110. Oftentimes, the longitudinal axis 112 and the shaft axis 118 are radially offset from one another to some degree as shown in FIG. 1A. The misalignment of axes 112 and 118 is typically less than about 6 inches, and more commonly about 3 inches, although the misalignment may vary. This can occur, for example, in land rigs when the RCD 102 and BOP 110 are aligned to the well head and the shaft 116 is aligned to the rig. Sealing element 114 can be made of any flexible material, such as rubber. In some embodiments, sealing element 114 can be an annular disc.

The material of sealing element 114 is commonly sufficiently elastic and/or flexible to allow a tool joint 120 of shaft 116 to be pulled or pushed through sealing element 114 while maintaining a seal against shaft 116 throughout the movement. In some embodiments, tool joint 120 can be 1 to 1.5 inches or more larger in diameter than shaft 116.

During rotation of the RCD 102, any eccentricity or misalignment in the system 100 is taken up in sealing element 114. Eccentricity within the system 100 is often caused by the misalignment between BOP 110 and shaft 116. To correct for this misalignment and to reduce or eliminate eccentricity within system 100, one or more alignment components 124 can be positioned between and coupled with either BOP 110, support section 104, or both BOP 110 and support section 104 such that an axis 108 of the RCD 102 and/or an axis 118 of shaft 116 are adjusted relative to the longitudinal axis 112 of BOP 110. Alignment components 124 allow support section 104 to be radially offset from BOP 110 to be aligned with the pressure drilling system equipment (e.g., an oil rig) and shaft 116. In this manner, the offset or misalignment between the shaft axis 118 and the longitudinal axis 112 of the BOP 110 can be accommodated, or otherwise accounted for, by alignment component 124. In some embodiments, alignment component 124 can include a pair of alignment components 124 coupled with the support section 104 and the BOP 110 such that an axis 108 of the RCD 102 is shifted radially relative to the BOP 110. The pair of alignment components 124 may be radially movable relative to one another such that the misalignment of the BOP 110 and RCD 102 is accommodated.

In some embodiments, alignment components 124 can include one or more off-set spool pieces 126, which are components having an angled middle section and one or more flanged ends. In some embodiments, off-set spool pieces 126 can be formed from pieces of pipe, beam, conduit or other material. Each off-set spool piece 126 may include an angled middle portion coupled with two flanged ends. For example, as shown in FIG. 1A, each off-set spool piece 126 can include a middle portion having two flanged ends.

In some embodiments, a pipe can be cut at an angle on a top end and a bottom end to create a slanted or angled pipe section having parallel top and bottom ends. A flange can then be welded or otherwise coupled with each end of the pipe such that the flanges are offset from each other. In some embodiments, the slanted or angled pipe section may have an angle of offset of less than or about 45 degrees. An important factor of the alignment components 124 is the integrity of the component. The ability to assemble the system and attach bolts into the flanged ends is also an important aspect of the components 124. In other embodiments, the pipe can be cut at a right angle to create a pipe with a roughly rectangular side profile. The flanges can then be welded or otherwise coupled with the pipe at an offset to each other to create a similar alignment effect as the off-set spool pieces 126 formed from angle-cut pipe.

The off-set spool piece(s) 126 can be positioned with respect to BOP 110 and RCD 102 so that a longitudinal axis of the middle portion is angled relative to the longitudinal axis 112 of the BOP 110 and axis 108 of RCD 102. Further, the two off-set spool pieces 126 may be shifted radially relative to one another to orient the off-set spool pieces 126 differently relative to each other. In some embodiments, the flanges of spool pieces 126 may be aligned for increased stability where an inner edge of a flange of the first spool piece is lined up with the inner edge of an adjacent flange of the second spool piece.

In other embodiments, flanges of spool pieces may be shifted relative to one another to allow for increased misalignment/offset correction, such as where an inner edge of a flange of a first spool piece is aligned with a middle portion of a flange of a second spool piece. Using two off-set spool pieces 126 in combination enables the alignment component 124 to account for a wide range of offsets or misalignments of the BOP 110, RCD 102, and shaft 116. In other embodiments, a single off-set spool piece 126 may be coupled with the BOP 110 and RCD 102 to account for a misalignment between these components. In still other embodiments, three or more off-set spool pieces 126 may be coupled together between the BOP 110 and RCD 102 to account for a misalignment between these components.

In the illustrated embodiments using two off-set spool pieces 126, the spool pieces 126 may be oriented in any way to adjust for a common amount of misalignment in the system 100. By using two off-set spool pieces 126 in this manner, the number of alignment components 124 that are needed at the drilling site can be minimized. FIGS. 1A and 1B show two embodiments of how the off-set spool pieces 126 may be oriented to account for varying misalignments of the BOP 110, RCD 102, and shaft 116. It should be realized, however, that the off-set spool pieces 126 may be oriented in a variety of other ways, relative to one another and/or to the BOP 110 and RCD 102, to account for a misalignment of the components.

As shown in FIG. 1A, two off-set spool pieces 126 are provided in an orientation to account for an increased misalignment between BOP 110, RCD 102, and shaft 116. Here, a longitudinal axis of each spool piece 126 is angled in the same direction and/or to roughly the same degree relative to the longitudinal axis 112 of the BOP 110. Both longitudinal axes of the spool pieces 126 are aligned such that spool pieces 126 cooperate to increase the offset or misalignment correction achieved. For example, the longitudinal axes of the spool pieces 126 are aligned so as to define an angular axis 125 that corresponds to the misalignment of the BOP 110, RCD 102, and shaft 116. The spool pieces 126 are coupled with a top portion of the BOP 110 and a bottom portion of the RCD 102 so that the axes, 108 and 118, of the RCD 102 and shaft 116, respectively, are shifted radially relative to axis 112 of BOP 110 as shown. In this configuration, the eccentric stress induced on the sealing element 114 is minimized or otherwise reduced during operation of the pressure drilling system equipment carried out on an oil rig.

FIG. 1B shows the off-set spool pieces 126 oriented to account for smaller misalignment between BOP 110, RCD 102, and shaft 116. Here, the spool pieces are oriented such that the longitudinal axes of the spool pieces 126 are angled opposite each other. In this configuration, the spool pieces 126 are aligned such that the longitudinal axes compete or counteract one another and thereby decrease the offset or misalignment achieved. This may result in little to no offset correction and may be useful in situations where minimal or no offset is needed between the shaft axis 118 and the longitudinal axis 112 of BOP 110. For example, the longitudinal axes of the spool pieces 126 may be aligned so as to define an angular axis (not shown) corresponding to a minor misalignment of the BOP 110, RCD 102, and shaft 116.

The spool pieces 126 may be coupled with a top portion of the BOP 110 and a bottom portion of the RCD 102 so that the axes, 108 and 118, of the RCD 102 and shaft 116, respectively, are shifted radially relative to axis 112 of BOP 110 by a minor amount. As with FIG. 1A, this configuration may also reduce or minimize the eccentric stress induced on the sealing element 114 during operation of the pressure drilling system. While FIGS. 1A and 1B show extreme orientations of the spool pieces 126, it should be realized that the spool pieces 126 may be positioned in any other orientation to account for offsets between these extreme conditions.

As described above, alignment components 124 allows the RCD 102 to be aligned with the pressure drilling system equipment (e.g., oil rig equipment) instead of the BOP 110 to ensure the shaft axis 118 and the longitudinal axis 112 have minimal offset. This reduces or eliminates the eccentricity in the shaft 116 during rotation that could cause premature failure of the sealing element.

Figure 2:
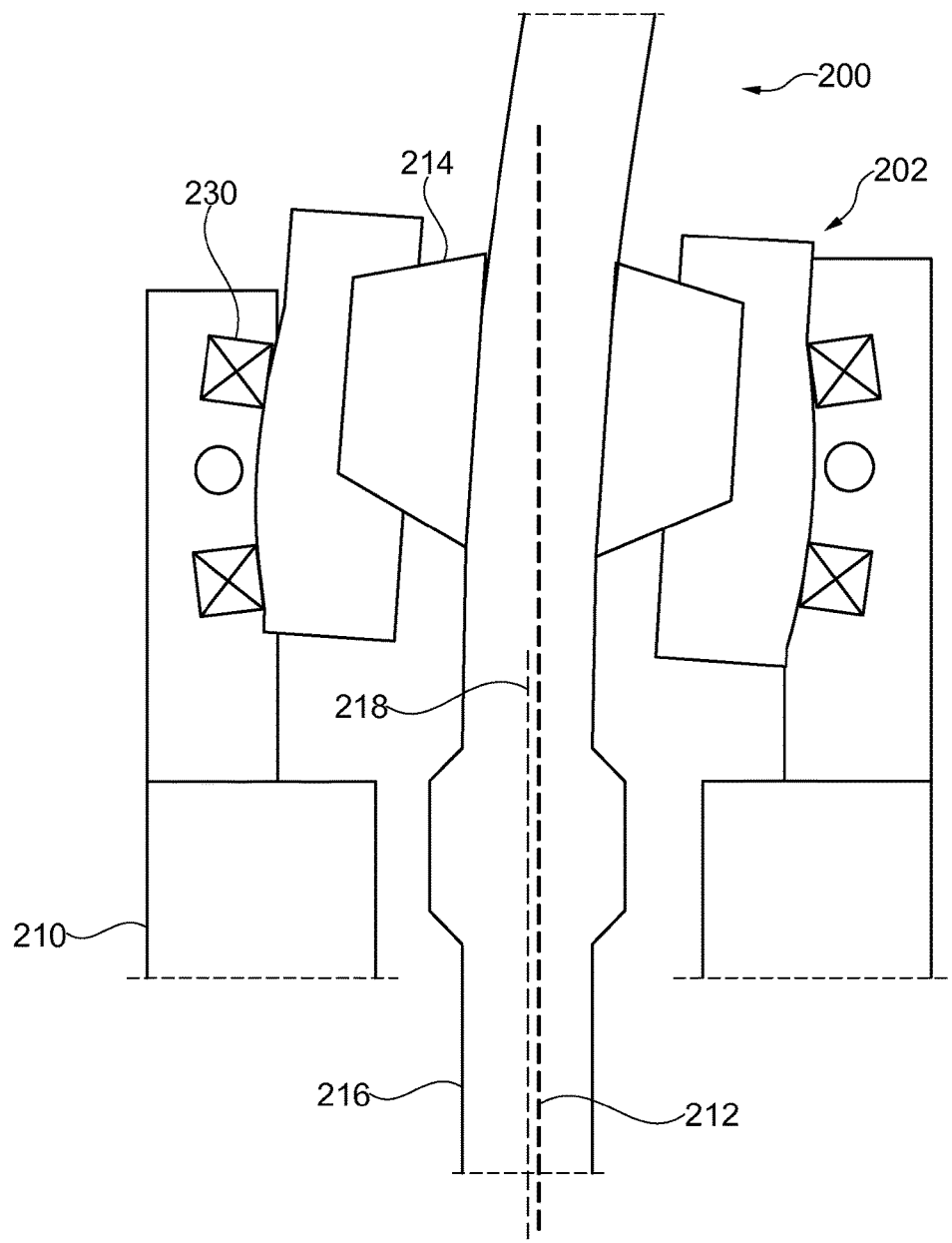
FIG. 2 shows a spherical bearing implemented with a rotating control device to account for misalignment of BOP and shaft according to embodiments of the invention.

In some embodiments, alignment component 124 may include a bearing that enables rotation of the rotating section 106 of the RCD 102 and also enables a portion of the RCD 102 to tilt. For example, FIG. 2 illustrates a drilling system 200 that utilizes a spherical bearing 230 for alignment of a BOP 210 and a RCD 202. RCD 202 can be coupled directly to BOP 210. In some embodiments, RCD 202 and BOP 210 can be coupled with alignment components, such as those described in FIGS. 1A and 1B, to provide additional alignment correction. RCD 202 may, in some embodiments, include a spherical bearing 230 to enable the rotation of the RCD 202 and a sealing element 214 just as the cylindrical bearing 122 described above with regard to FIGS. 1A and 1B. Spherical bearing 230 also allows RCD 202 and shaft 216 to tilt, thus accounting for some degree of offset between shaft axis 218 and longitudinal axis 212 of BOP 210. In some embodiments, tilting an RCD can be achieved by mounting the RCD on gimbals, using a compliant mounting system similar to an engine bearing system in a vehicle, or by use of a hydraulic device.

Figure 3:
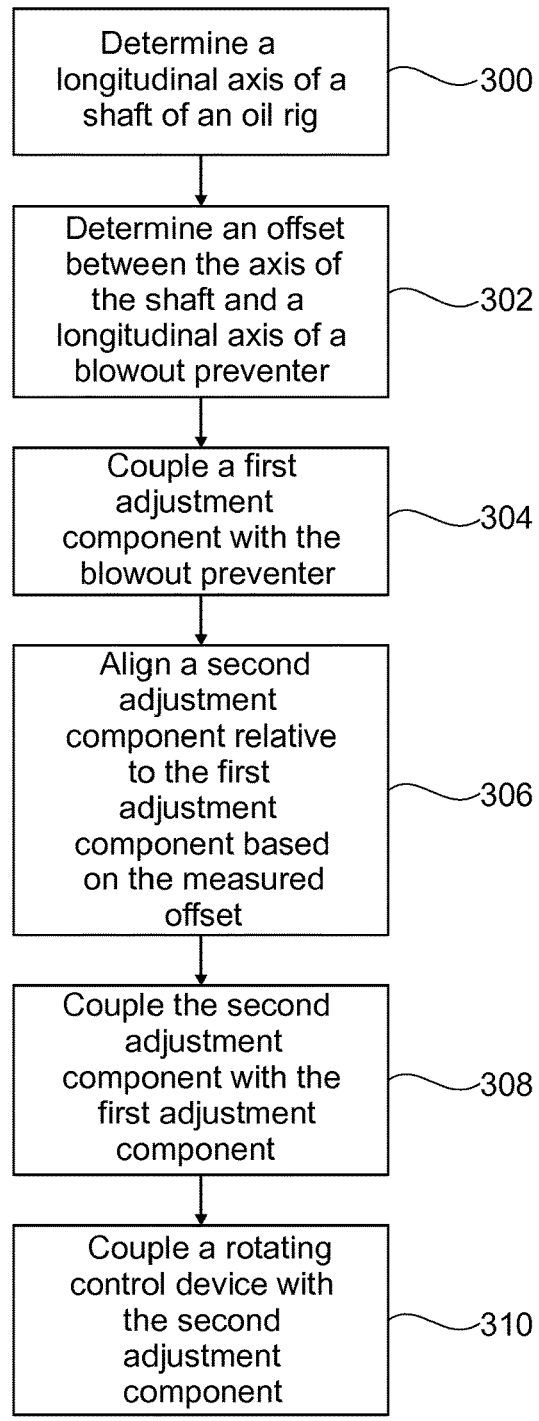
FIG. 3 shows a flowchart of a method of aligning oil drilling equipment according to embodiments of the invention.

FIG. 3 provides a method for aligning oil drilling equipment, in accordance with an embodiment of the present disclosure. The method can include determining a longitudinal axis of a shaft of the pressure drilling system (e.g., an oil rig) at block 300. In some embodiments, the longitudinal axis may be determined by attaching a laser device to a bottom of the shaft or other equipment such that a beam of the laser device corresponds to the longitudinal axis of the shaft, moving the shaft, and monitoring a position of the beam produced by the laser device. Monitoring the beam position can be done visually, using sensors, or using any other detection techniques. Determining the longitudinal axis can further include rotating the shaft and monitoring a position of the beam. This can help identify eccentricity within the drilling equipment associated with misalignment.

In other embodiments, determining the longitudinal axis can include coupling a plumb line with the shaft to detect the longitudinal axis. For example, a weight suspended from a cable or other line may be hung from a central portion of a bottom surface of the shaft or other equipment such that the hanging weight and line indicate a longitudinal axis of the shaft. An offset between the axis of the shaft and a longitudinal axis of a blowout preventer can be determined at block 302. A first adjustment component may be coupled with the blowout preventer at block 304. At block 306, a second adjustment component may be aligned relative to the first adjustment component based on the measured offset. In some embodiments, the first and second adjustment components can each include an angled middle portion coupled with two flanged ends. The second adjustment component may be coupled with the first adjustment component at block 308.

A rotating control device may be coupled with the second adjustment component at block 310 such that an axis of the rotating control device corresponds with the axis of the shaft to account for the measured offset. The method can also include positioning a sealing component between the shaft and the rotating control device to seal a drilling annulus for pressurized drilling operations. In some embodiments, the sealing component can be a rubber annular disc.

CONDITION MONITORING AND FAILURE PREDICTION

Oftentimes, fatigue driven mini fractures form within the body of the sealing element prior to a catastrophic failure of the sealing element. Locally, these mini fractures may change the stress strain response of the sealing element. As a tool joint of the shaft is pulled through the sealing element, the flexing of the sealing element can cause a massive distortion of the sealing element. In a failing sealing element, local changes or fractures typically change the response to this distortion. By monitoring such changes, the condition of the sealing element can be characterized.

Global changes can also be considered. For example, a change in stiffness of the sealing element may change the amount of force required to pull a tool joint of the shaft through the sealing element. In accordance with an embodiment of the present invention, by tracking load measurements as each tool joint passes through the sealing element, changes in the response that indicate failure of the sealing element can be detected.

Referring back to FIG. 1A, a system 100 for predicting a failure of a sealing element of a pressure drilling system is shown. As described above, system 100 includes the BOP 110 coupled with the RCD 102. The system 100 also includes a sealing element 114 configured to seal against a shaft 116 disposed within the RCD 102. Physical responses of the sealing element 114 during rotation of shaft 116 or during interactions with tool joint 120 of shaft 116 can be monitored and tracked over time to identify changes in the response. Changes in the response can include precursors to failure, which are used to predict a remaining life or an impending catastrophic failure of the sealing element 114. Additionally, catastrophic failure can result in damage to other components of system 100. Thus, response detection and failure prediction save considerable time and money associated with failure of the sealing element.

According to some embodiments of the present disclosure, replacement of sealing element 114 may be scheduled based on the remaining life and/or predicted impending catastrophic failure. Such replacement scheduling can result in improvements in safety and integrity of the entire drilling operation, as well as reduce time and cost associated with the replacement of the sealing element and/or other components that may be damaged by a catastrophic failure of the sealing element 114. Precursors to failure can include any changes in response of material of the sealing element 114 that are detected. For example, changes could include changes in symmetry or magnitude of the responses as compared to responses from previous cycles. These changes in response can be associated with fractures occurring within the sealing element 114 that indicate an impending failure of the sealing element 114. For example, the failure mechanism for sealing element 114 is often a radial fracture from an inner edge of sealing element 114 across to an outer edge of sealing element 114.

Prior to failure, measurements such as stress and strain are fairly uniform throughout sealing element 114. Some non-uniform measurements may exist, especially in sealing elements that have been cast or molded, where heterogeneity in the material can result in local variations of stiffness. However, the system response will be non-uniform, but repeatable in a non-damaged sealing element 114. The repeatability enables the responses to be tracked such that any detected changes signify structural changes to the sealing element that may indicate impending failure.

The sealing element 114 can include a conductive material, typically added upon formation of the sealing element 114. In some embodiments, the conductive material may be carbon black or the like, although other conductive material may be used, alone or in conjunction with carbon black. System 100 can further include a pair or network of electrodes (not shown) that monitor an electrical resistance of the sealing element 114 to determine if the sealing element 114 has been damaged or if other changes to the condition of the sealing element 114 have occurred. Changes in the electrical resistance of the sealing element 114, either instantaneous or in relation to historical data, may signal damage or other changes to the condition of the sealing element that warrant further consideration or that identify a pending failure of the sealing element 114. A further investigation of the sealing element 114 or a maintenance or replacement of the sealing element 114 may then be scheduled. In other embodiments, the operating conditions of the pressure drilling system equipment may be adjusted to reduce stress on and/or enhance the life of the sealing element 114.

System 100 may further include one or more sensors 128 coupled with one or more of the sealing element 114, the BOP 110, the shaft 116, or the RCD 102 to monitor characteristics of one or more of the components. Sensors 128 can be disposed in proximity with sealing element 114, such as above, behind, below, in, or on sealing element 114. In some embodiments, the sensors 128 can be disposed on the rotating section 106, such as by using a rotary encoder (not shown) to correlate load measurements to rotation of the shaft.

For example, a rotary encoder can be configured to detect changes in a rotary speed of the shaft 116 such that changes in lateral stiffness of the sealing element 114 are identifiable when the shaft 116 is eccentric in the RCD 102. These changes can indicate precursors to failure. Other embodiments may include the sensors 128 disposed on the support section 104.

In some embodiments, the sensors 128 can be configured to detect deformation of the sealing element 114 associated with a tool joint 120 of the shaft 116 as the tool joint 120 is pulled through the sealing element 114. The deformation responses of the sealing element 114 can be monitored to detect or otherwise identify any changes in a deformation pattern associated with the sealing element 114. For example, sensors 128 can detect deformation of the sealing element 114 such that any change in the symmetry or magnitude of the deformation that indicates failure of the sealing element 114 may be identified.

Sensors 128 can include one or more of strain gauges, stress sensors, temperature sensors, load cells, deformation sensors, pressure sensors, and the like. Sensors 128 can be configured to detect signals indicating an impending failure of the sealing element 114 such that a sealing element replacement procedure can be scheduled based at least in part on a predicted remaining life of the sealing element 114. Additionally, rotation of the shaft 116 can be slowed, the amount of coolant used in the system 100 can be increased, and/or other precautions can be taken to prolong a life of the sealing element 114 and/or otherwise delay a replacement procedure until a desirable time based on the predicted remaining life.

Figure 4:
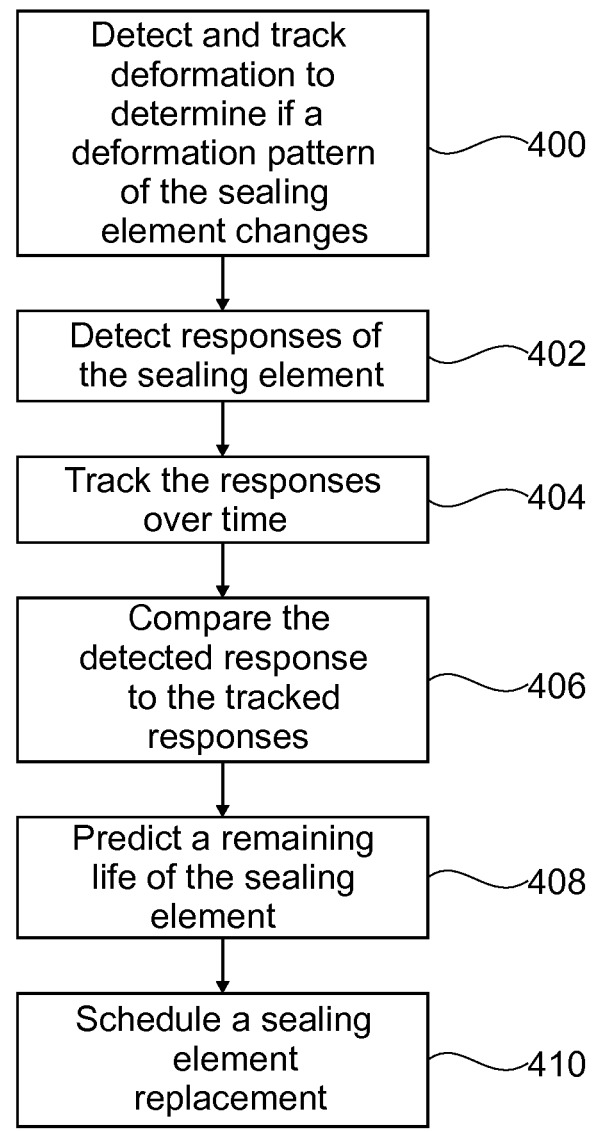
FIG. 4 depicts a flowchart of a method of detecting a condition of a sealing element of a pressure drilling system according to embodiments of the invention.

FIG. 4 illustrates a method for predicting failure of a sealing element of a pressure drilling system. Deformation associated with a tool joint of a shaft as the tool joint is pulled through a sealing element of an RCD can be detected and tracked to determine if a deformation pattern of the sealing element changes at block 400. Responses of the sealing element due to one or more of stress, strain, temperature, mechanical load, pressure, and the like may be detected using a network of sensors in or around the sealing element at block 402. Response detection can occur during shaft rotation and tool joint interactions that occur during operation of the RCD in an oil exploration procedure. In some embodiments, the detection includes detecting or measuring deformation of the sealing element and identifying any change in the symmetry or magnitude of the deformation that indicates impending failure of the sealing element or is otherwise indicative of damage to the sealing element. Identification of changes can include comparing the measured deformation to historical data. In other embodiments, the response detection includes comparing sensed responses of a network of sensors positioned in proximity to the sealing element.

The sensors can include one or more of strain gauges, stress sensors, temperature sensors, load cells, deformation sensors, pressure sensors, and the like. At block 404, the responses can be tracked over time. The detected responses are compared to tracked responses at block 406 to identify changes in the symmetry of the responses over time and/or changes in magnitude of the responses over time. For example, the detected response can be compared to data of previously detected responses to identify structural changes in the sealing element by determining a deviation of the detected response from a typical response of the data of previously detected responses. The changes can be associated with fractures occurring within the sealing element.

In some embodiments, variations in a rotary speed of the shaft can be detected to identify changes in lateral stiffness of the sealing element. For example, radial fractures often form from an inner edge of the sealing element to an outer edge of the sealing element as the sealing element approaches catastrophic failure. The change in the local stiffness of the element caused by these fractures will cause a modulation in the rotary speed of the element as it rotates. Using a rotary encoder to measure the element position and derive the instantaneous speed will enable detection of this modulation and warning that these fractures are forming. In other embodiments, the sealing element can include a conductive material. An electrical resistance of the sealing element may be sensed and changes in the electrical resistance can be detected which are indicative of damage to the sealing element. At block 408, a remaining life of the sealing element may be predicted based on the structural and/or response changes. A sealing element replacement time may be scheduled at block 410 based at least in part on the predicted remaining life.

Figure 5:
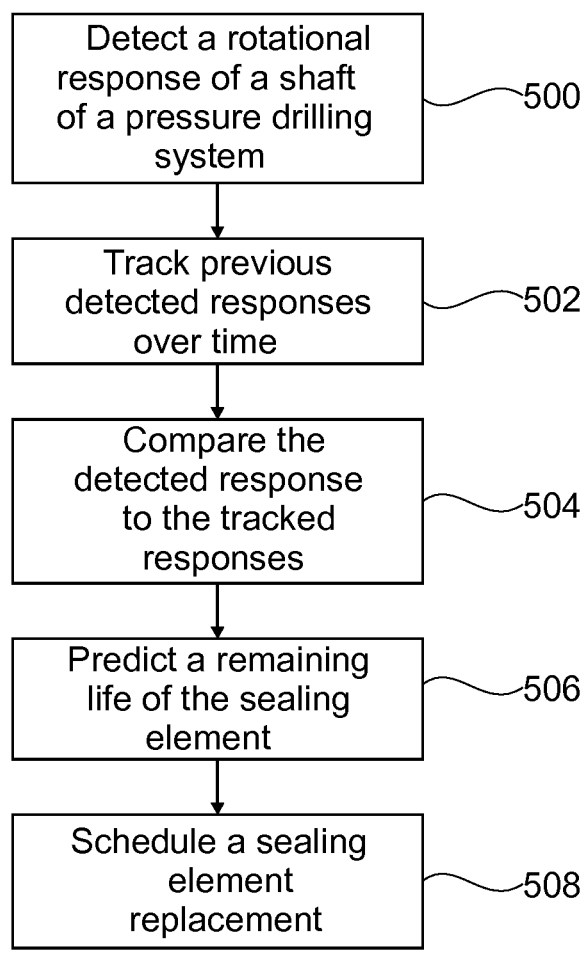
FIG. 5 depicts a flowchart of a method for predicting a failure of a sealing element of a pressure drilling system according to embodiments of the invention.

FIG. 5 illustrates a method for predicting a failure of a sealing element of a pressure drilling system. A rotational response of a shaft of the pressure drilling system is detected at block 500 as the shaft rotates relative to a blowout preventer. In some embodiments, the rotational response of the shaft may be a change or changes in instantaneous rotary speed and/or a change or changes in torque measured at the top drive. In other embodiments, position sensors (e.g., proximity, range finders (e.g., lasers, etc.), and the like) may be mounted on top of the RCD to detect the rotational response of the shaft. The position sensors may detect changes in the coupling of the sealing element driven by changes in the structure of the element. As described herein, the shaft is coupled with a rotating control device that facilitates in rotation of the shaft relative to the blowout preventer. At block 502, previous detected rotational responses of the shaft are tracked over time. The detected response are compared to the tracked responses at block 504 to identify an eccentricity of the shaft over time that signals a potential fracture occurring within a sealing element positioned between the shaft and the rotating control device. A remaining life of the sealing element is predicted at block 506 based on the identified eccentricity. At block 508 a sealing element replacement is scheduled based at least in part on the predicted remaining life.

In some embodiments, variations in a rotary speed of the RCD element/sealing element may indicate a breaking of symmetry between/misalignment of the different parts of the drilling system, including changes in the symmetry of the RCD element/sealing element itself due to damage. In some aspects, the torque or shaft speed of the drill string may be tracked and resolved with a rotation of the shaft. Periodic changes in the rotary speed may indicate changes in the symmetry and reaction torque of the RCD element/sealing element due to damage.

In some embodiments, the method may also include detecting variations in a rotary speed of the shaft to identify changes in lateral stiffness of the sealing element. In some embodiments, the method may further include detecting responses of the sealing element due to one or more of stress, strain, temperature, mechanical load, and/or pressure using a network of sensors in or around the sealing element.

In some embodiments, detecting the rotational response includes detecting a deformation of the sealing element and identifying any change in the symmetry and/or magnitude of the deformation indicative of an impending failure of the sealing element. In some embodiments, the sealing element includes a conductive material and detecting the rotational response includes sensing an electrical resistance of the sealing element and detecting changes in the electrical resistance indicative of damage to the sealing element. In some embodiments, a lateral displacement of the shaft adjacent the sealing element may be detected to detect changes in the sealing element that signal a current or impending failure of the sealing element. In some embodiments, the shaft may be laterally displaced within the sealing element or directly adjacent thereto. In some embodiments, detecting the rotational response of the shaft may include using proximity detectors or range finders as described above.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known, processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for monitoring a condition of a rotating control device (RCD) during a managed pressure drilling operation, the RCD including a support section and a rotatable section that is rotatable relative to the support section, the sealing element being positioned in an interior of the rotatable section to seal against a rotatable shaft, the method comprising:
   measuring a first deformation response of the sealing element to one or more of stress, strain, temperature, mechanical load, and pressure using a network of sensors disposed around the sealing element;
   tracking deformation responses over time by:
      measuring one or more additional such deformation responses of the sealing element over time;
      comparing the first deformation response and the one or more additional such deformation responses over time to determine any change in a symmetry of the deformation responses over time or in a magnitude of the deformation responses over time which signify a structural change in the sealing element associated with a fracture occurring within the sealing element; and
   managing operation of the sealing element based upon the determined change in the symmetry or magnitude of the tracked deformation responses over time.

2. The method according to claim 1, wherein managing operation of the sealing element comprises predicting a remaining life of the sealing element based on the determined change.

3. The method according to claim 2, wherein managing operation of the sealing element comprises scheduling a sealing element replacement based at least in part on the predicted remaining life.

4. The method according to claim 1, wherein managing operation of the sealing element comprises at least one of adjusting operation of the sealing element and adjusting the sealing element.

5. The method according to claim 1, further comprising:
   communicating the determined change to a processor controlling the managed pressure drilling operation.

6. The method according to claim 1, wherein the structural change in the sealing element associated with the fracture occurring within the sealing element indicates impending failure of the sealing element.

7. The method according to claim 1, further comprising:
   measuring the one or more additional such deformation responses of the sealing element over time as a tool joint of the rotatable shaft is pulled through the sealing element.

8. The method according to claim 7, further comprising:
   detecting variations in a rotary speed of the shaft to identify changes in lateral stiffness of the sealing element.

9. The method according to claim 1, wherein the sealing element comprises a conductive material, and wherein the method further comprises sensing an electrical resistance of the sealing element and detecting changes in the electrical resistance indicative of damage to the sealing element.

* * * * *